United States Patent [19]

Redmond et al.

[11] Patent Number: 4,736,341

[45] Date of Patent: Apr. 5, 1988

[54] INTELLIGENT HARD DISK DRIVE SUBSYSTEM

[75] Inventors: Donald R. Redmond, San Jose; John J. Schadegg, Foster City, both of Calif.

[73] Assignee: Xebec Development Partners, Ltd., San Jose, Calif.

[21] Appl. No.: 750,684

[22] Filed: Jun. 28, 1985

[51] Int. Cl.$^4$ .............................................. G11B 21/02
[52] U.S. Cl. ................................... 364/900; 360/75
[58] Field of Search ... 364/200 MS File, 900 MS File; 360/77, 75, 78, 39, 53, 105, 106, 107, 109; 369/51

[56] References Cited

U.S. PATENT DOCUMENTS

| | | | |
|---|---|---|---|
| 3,956,736 | 5/1976 | Jacques et al. | 364/200 |
| 4,210,959 | 7/1980 | Wozniak | 364/200 |
| 4,241,420 | 12/1980 | Fish et al. | 364/900 |
| 4,454,595 | 6/1984 | Cage | 364/900 |
| 4,509,118 | 4/1985 | Shenk | 364/200 |
| 4,589,037 | 5/1986 | Jen et al. | 360/77 |

Primary Examiner—Thomas M. Heckler
Assistant Examiner—Kevin A. Kriess
Attorney, Agent, or Firm—Spensley Horn Jubas & Lubitz

[57] ABSTRACT

An intelligent hard disk drive subsystem including control circuitry and disk drive storage media along with drive mechanics in a combination including a standardized interface between the intelligent subsystem and a host computer wherein the data is buffered, serialized, deserialized, conditioned, precompensated, and located within the media, all under the control of a microprocessor within the subsystem. A method of formatting the media is provided which eliminates the need for a track 0 sensing switch, and which provides for formatted guard bands on the disk. The formatting process locates the head through a sequence of writing, indexing, and reading, until a stop is located by the fact that the head reads what it has just written.

3 Claims, 3 Drawing Sheets

FIG. 1 INTELLIGENT HARD DISK DRIVE SUBSYSTEM

INTELLIGENT HARD DISK DRIVE SUBSYSTEM

BACKGROUND OF INVENTION

1. Field of the Invention

The invention relates generally to the field of data processing system peripheral data storage devices, and more particularly to rigid disk storage subsystems.

2. Description of the Prior Art

Mass storage devices have existed for many years for large mainframe computer installations. More recently, the proliferation of mini and microcomputers has promoted a rapidly developing technology of smaller, relatively less costly, storage devices in an approximate range of five megabytes to 32 megabytes, to provide the increasing storage needs of users of these small computers. The need for these five to 32 megabyte storage devices has been further prompted as the availability of software and the sophistication of the users of these small computers have both increased.

Manufacturers of small computer systems generally assemble into a package a host computer and a group of peripherals devices, frequently including a hard disk drive for what is referred to as mass storage. The hard disk drive may be external to the cabinet containing the computer, or may be mounted within the same cabinet. Internal hard disk drives take up space which is at a premium within the main cabinet, but provide better reliability and less vulnerability as compared with external disk drives which are connected by long exposed cables.

The disk drives themselves have typically been made to interface with the electronics of the host computer through a standard interface referred to as an ST506 interface. Through implementation of the ST506 interface, sufficient definition has been achieved so that the disk drive can be treated as a "black box" defined by a specification and by the ST506 interface. The system manufacturer can purchase disk drives for integration into its system without concern for the details of the internal construction of the drive, and can purchase from various sources treating the disk drives as equivalent. Disk drives interfacing through the ST506 interface are referred to as "dumb" devices. That is, none of the control circuitry which establishes sector formatting, initiates head movement and selection, performs data buffering, etc. are provided in the disk drive. The "intelligent" control of the disk drive is provided by a disk drive controller which is on the host system side of the ST506 interface. The disk drive controller is typically manufactured by different suppliers than the disk drive manufacturers, and the disk drive controller typically treats the disk drive as a "black box" defined by a specification and the ST506 interface. The disk drive controller is often custom designed to interface with a particular architecture of the host computer system with which it is intended to work, but is able to work with most any disk drive that supports the ST506 interface. Disk drive controllers, therefore, tend to be host system dependent, and disk drive independent.

Supporting the ST506 interface places certain burdens on the total system. The rigidity of the standard stifles the opportunity to develop improvements in the disk drive which would require changes in the controller in order to utilize them. The conversion to and from the ST506 bus also utilizes power and requires additional components, increasing both heat generation and risk of failure. In addition, separating the intimate relationship between the drive and the controller with a standard interface causes possible problems of small production variations causing incompatibility between a particular drive/controller pair.

One example of a requirement placed on a disk drive by the ST506 interface is the track 0 sensing switch. When a disk drive is first powered up, the head could be anywhere on the disk. It is necessary to first locate the head, after which various methods may be used to keep track of its location. The ST506 interface has built into it a requirement of a track 0 sensing switch to locate the head when it is at the track 0 position. Track 0 sensing switches are subject to delicate adjustment, and alternate methods of locating the head could improve reliability. The ST506 interface is a limiting factor in that regard, however. Although controllers can be made which do not utilize the track zero sensing switch, a disk drive must have the track zero switch to fully support the ST506 interface.

If the standard interface approach were moved to the host system/controller side of the controller, instead of on the controller/disk drive side of the controller, and if the controller were integrated into the disk drive, substantial advantages over the prior art would be realized.

SUMMARY OF THE INVENTION

It is therefore an object of the present invention to provide an intelligent hard disk drive subsystem with the functions of a disk drive controller incorporated into the disk drive package.

It is a further object to provide a standard interface between the intelligent disk drive subsystem and the host system.

It is a further object to provide a more compact disk drive and controller subsystem than disk drives which require a separate disk drive controller.

It is a further object to provide a more economical disk drive and controller subsystem than disk drives which require a separate disk drive controller.

It is a further object to provide a method for formatting a disk which eliminates the need for a track 0 sensing switch in the disk drive.

It is a further object to eliminate the ST506 interface between the controller and the disk drive, and to thereby eliminate the heat, cost and detrimental effect on reliability associated therewith.

It is a further object to provide a disk drive subsystem for which the internal recording technique and process are independent of the interface to the host computer system, whereby data transfer rate and media organization and allocation are transparent to the host computer system.

It is a still further object to provide an intelligent disk drive subsystem which inherently provides the benefits associated with tested pair matching of controllers and disk drives, and which inherently provides single source responsibility for compatibility between the controller and the disk drive.

Briefly, a preferred embodiment of the present invention includes an intelligent disk drive subsystem for magnetically storing and retrieving data for a host system. The intelligent hard disk drive subsystem includes an input bus and an interface which matches the input bus to an internal bus. The internal bus is connected to a microprocessor, a sector buffer, a sector buffer controller, a serdes ECC, a state machine, a stepper controller, and a spindle motor controller. The stepper controller is, in turn, connected to a stepper positioner which is, in turn, connected to a set of magnetic read/write heads which are magnetically coupled to a hard disk magnetic media. The hard disk magnetic media is connected to a spindle motor which is connected to the spindle motor controller. The magnetic read/write heads are connected to a preamp/driver which is connected to a read channel and to a write channel. The read channel is connected to a data separator which is connected to the serdes ECC, and the serdes ECC is also connected to an NRZ to MFM converter which is connected to a write precompensator, which is, in turn, connected to the write channel.

In operation, data and control signals are supplied to the hard disk drive through the input bus under a standardized protocol, and are converted to an internal protocol by the interface, and transferred to the internal bus. Data sent to the disk drive subsystem are stored on the hard disk magnetic media, and data stored on a hard disk magnetic media can be retrieved and returned to the host system. Data to be stored is converted from parallel to serial by the serdes ECC and converted from NRZ to MFM format by the NRZ to MFM converter. The MFM format data is then adjusted with respect to the timing of the pulses to compensate for the proximity influence of adjacent bit data by the write precompensator. The signal from the precompensator is amplified and conditioned by the write channel, and amplified by the driver which provides the data to the magnetic read/write head which, in turn, places the data on the hard disk magnetic media in the form of residual magnetic fields.

Data is recovered by the magnetic read/write heads, amplified by the read channel, converted from MFM to NRZ format by the data separator, and converted to parallel form and checked for errors by the serdes ECC. The stepper controller controls the stepper positioner in positioning the magnetic read/write heads; the spindle motor controller regulates the speed and operation of the spindle motor; and the sector buffer, operating under control of the sector buffer controller, buffers data so that the data transfer rates between the hard disk media and the host system match. The state controller synchronizes the interface, the serdes ECC, and the sector buffer. The microprocessor controls the entire operation of the intelligent hard disk drive subsystem in response to command signals received from the host system.

A method of providing a substitute for a track 0 sensing switch is provided with the present invention. That method includes sequentially formatting tracks on the disk, identifying each formatted track in an identification field, moving from track to track in an outward direction, and reading the track after each time the head is indexed by one track. When the head hits the outside mechanical stop, the attempted indexing of the head will fail to reach a new track, and the previously-formatted track will be read and identified. The disk is then formatted from the outside inward track by track, identifying each track in the identification field, and designating an arbitrary number of outside tracks as a guard band. The outermost data track is identified in the identification field as track 0, and each sequential track in an inward direction as a data track numbered with an incremental number, until the desired number of data tracks have been formatted, and an arbitrary number of inside tracks are identified in the identification field as an inside guard band. The head landing track is normally one of the tracks within the inside guard band. In an alternate embodiment, the above procedure could be reversed, first locating the inside mechanical stop and then performing the final formatting from the inside out.

An advantage of the present invention is that it provides an intelligent hard disk drive subsystem with the functions of a disk drive controller incorporated into the disk drive package.

It is a further advantage that it provides a standard interface between the intelligent disk drive subsystem and the host system.

It is a further advantage that it provides a more compact disk drive and controller subsystem than disk drives which require a separate disk drive controller.

It is a further advantage that it provides a more economical disk drive and controller subsystem than disk drives which require a separate disk drive controller.

It is a further advantage that it provides a method for formatting a disk which eliminates the need for a track 0 sensing switch in the disk drive.

It is a further advantage that it eliminates the ST506 interface between the controller and the disk drive, and thereby eliminates the heat, cost and detrimental effect on reliability associated therewith.

It is a further advantage that it provides an intelligent disk drive subsystem which inherently provides the benefits associated with tested pair matching of controllers and disk drives, and which inherently provides single source responsibility for compatibility between the controller and the disk drive.

These and other objects and advantages of the present invention will no doubt become obvious to those of ordinary skill in the art after having read the following detailed description of the preferred embodiment which is illustrated by the various drawing figures.

IN THE DRAWINGS

DETAILED DESCRIPTION OF THE PREFERRED EMBODIMENT

Figure 1:
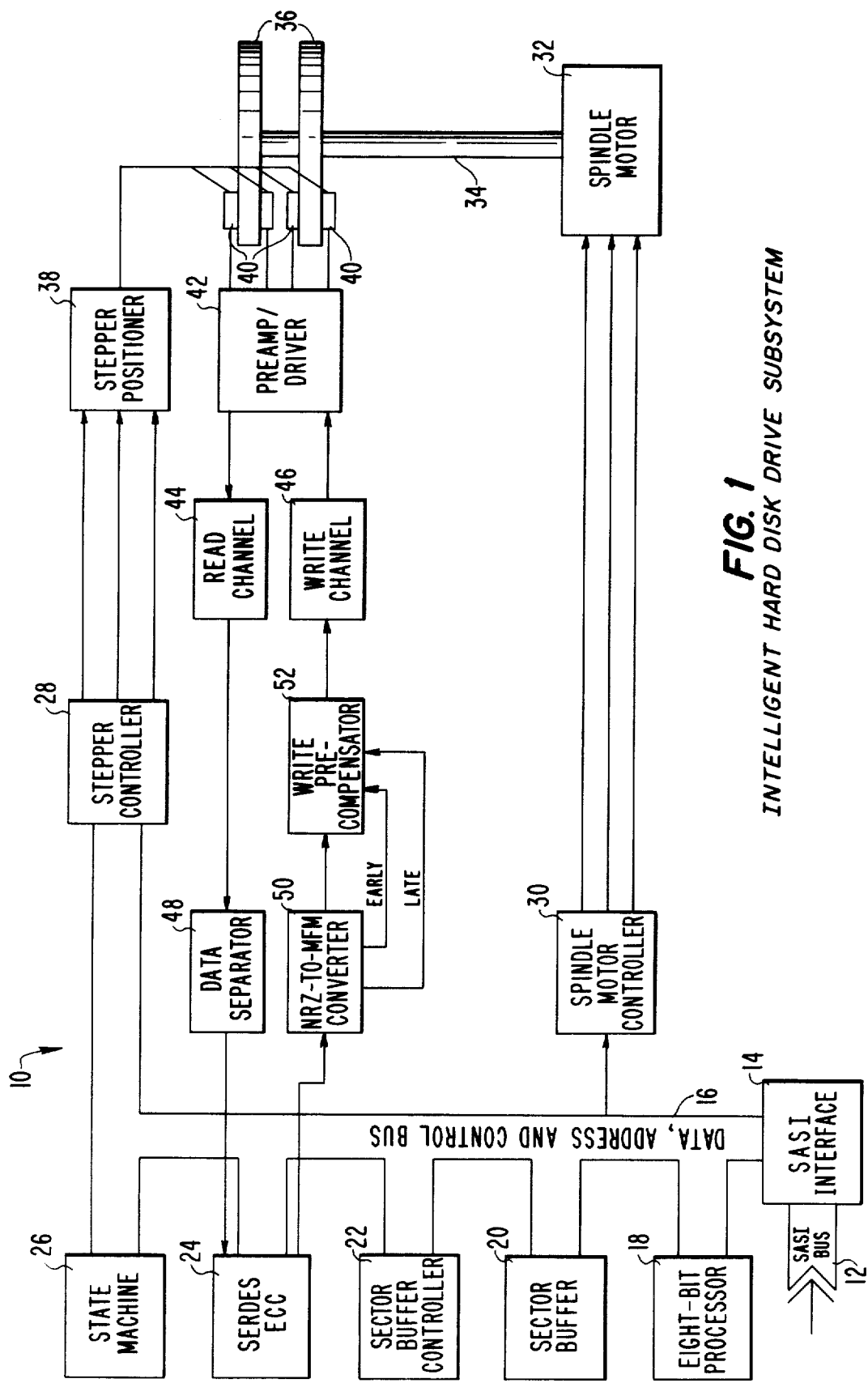
FIG. 1 is a diagrammatic representation of the intelligent hard disk drive subsystem in accordance with the present invention.

Referring to FIG. 1, there is illustrated an intelligent hard disk drive subsystem referred to by the general reference character 10 incorporating the present invention. The subsystem 10 includes an input connection for connection to a host system referred to as an input bus 12 which is connected to an interface 14. Interface 14 is connected to an internal bus 16 which is a composite data bus, address bus and control bus. Internal bus 16 is connected to an eight-bit microprocessor 18, to a sector buffer 20, to a sector buffer controller 22, to a serdes ECC 24, to a state machine 26, to a stepper controller 28, and to a spindle motor controller 30. The spindle motor controller 30 is connected to a spindle motor 32 which is connected to a spindle 34 which is connected to a pair of double-sided hard disk magnetic media 36 capable of storing digital data by means of residual magnetism. The stepper controller 28 is connected to a stepper positioner 38 which is physically connected to a set of four magnetic read/write heads 40 in a manner which allows the positioner 38 to repeatably position the heads 40 at multiple predetermined positions very near to the surface of media 36 with the multiple predetermined positions differing in their distance from the center of the media. A preamplifier/driver 42 is connected to each of heads 40, and is also connected to a read channel 44 and a write channel 46. A data separator 48 is connected to read channel 44 and to serdes ECC 24. An NRZ-to-MFM converter 50 is connected to the serdes ECC 24, and to a write precompensator 52.

Figure 2:
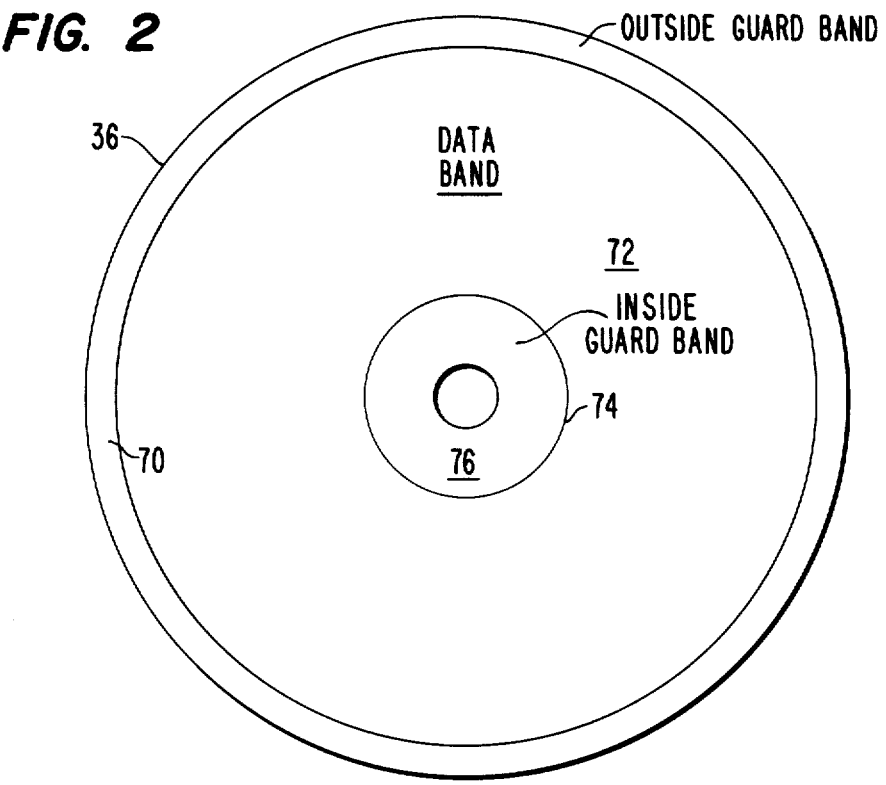
FIG. 2 is a diagrammatic representation of the hard disk magnetic media of the present invention, illustrating the respective regions of the disk media.

FIG. 2 illustrates the functional organization of the hard disk magnetic media 36. Each recording surface of the media 36 is broken up into three regions: an outside guard band 70 which comprises a small region on the surface of media 36 near its outside diameter; a data band 72 which comprises the surface of the media 36 extending between the outside guard band 70 and an inside diameter 74; and an inside guard band 76 in the region inside diameter 74. The location of diameter 74 is a function of the effective useable area of media 36 for effective data storage.

Figure 3:
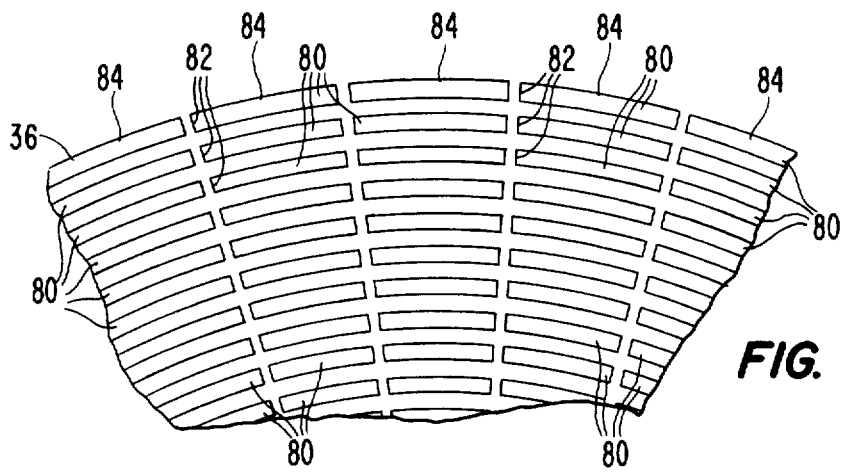
FIG. 3 is a diagrammatic representation of a section of the hard disk magnetic media of the present invention, illustrating the concept of sectoring a disk.

FIG. 3 illustrates a section of media 36, and diagramatically represents the sector formatting which is used to store data. A plurality of sectors 80 are symbolically represented as curvalinear rectangles. Each of the sectors 80 include a very small area referred to as an identification field 82 (only a few are labeled in the drawing) and reside at the leading edge of the sectors 80. All of the sectors 80 located at the same diameter are referred to as being located on a track; e.g., a track 84. (Only one such track is labeled on the drawing, and only part of that track is illustrated in the drawing.) The identification fields 82 contain data identifying the track, the sector, and specifying whether the particular sector is in outside guard band 70, data band 72, or inside guard band 76.

In operation, intelligent hard disk drive subsystem 10 receives and sends data and control signals to and from a host system through the input bus 12. The bus 12 uses a standardized protocol which is a modified version of the SASI interface and is referred to in the industry as the Xebec SASI Interface. The interfacing between bus 12 and bus 16, matching the protocols of the two busses to each other, is provided by interface 14. The processor 18, which is a Z80 with associated ROM in the preferred embodiment, interprets commands from the host system and manages, accordingly, the operation of the intelligent hard disk drive subsystem 10. The sector buffer 20, under the control of the sector buffer controller 22, matches data transfer rates by buffering data transfers between the disk drive subsystem 10 and the host system. The serdes ECC 24 converts parallel data from bus 16 to serial data so that it can be stored sequentially on media 36. The serdes ECC 24 also converts serial data received from media 36 via the read channel 44 and data separator 48 to parallel data which it places on bus 16. In addition, serdes ECC 24 calculates error codes and appends them to data being written, and also checks error codes on read data, performing corrections when necessary. State machine 26 controls and synchronizes the operation of interface 14, serdes ECC 24, and sector buffer 20. Data separator 48 converts MFM data received from the head 40 via preamp/driver 42 and read channel 44 to NRZ data. The read channel 44 conditions the signal from preamp/driver 42 for input into data separator 48. NRZ-to-MFM converter 50 receives NRZ data from the serdes ECC 24 and converts it to MFM data. Converter 50 also provides a pair of signals providing information about subsequent bits when forwarding a data bit to write precompensator 52. Depending on the sequence of bits, it may be necessary to slightly advance or delay the timing of a data bit in order to store the data in the proper location on media 36. This occurs because the presence of other bits on media 36 constitute residual magnetic fields which interact with the magnetic field generated by head 40 when writing. The small adjustments in timing required to properly locate the data on media 36 are performed by the write precompensator 52 in response to signals provided to it by converter 50. The need for, and the required amount of, precompensation is also influenced by the structure of the media 36. If plated media rather than oxide media is used, write precompensation can be eliminated. The write channel 46 receives a signal from precompensator 52, conditions it for input into the driver portion of preamp/driver 42, and provides it thereto. The driver portion of preamp 42 then provides a signal to one of the heads 40 which records the data on media 36 as a residual magnetic field. The specific head of the heads 40 used at any time is selected by the preamp/driver 42, which amplifies read signals when data is being read from media 36, and amplifies write signals when data is being recorded on media 36. The stepper/positioner 38, which is controlled by the stepper controller 28 positions the heads 40 at the desired diameter position of media 36 of the particular track to which, or from which, data is to be transferred. Positioner 38 increments heads 40 in discrete steps corresponding to track locations.

Figure 4:
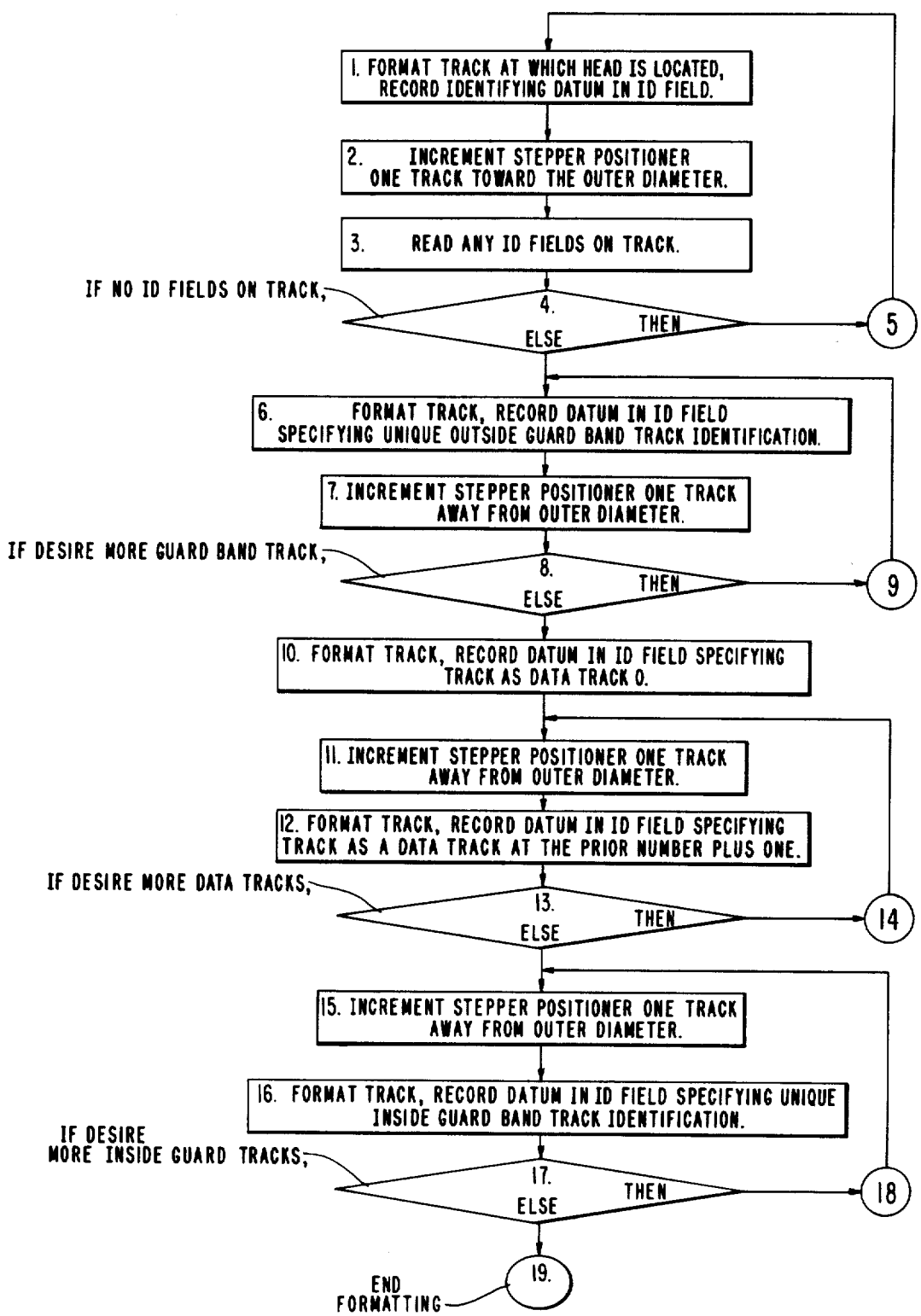
FIG. 4 is a flowchart illustrating the process of formatting the hard disk magnetic media of the present invention.

Formatting of media 36 must be done to identify the data on media 36 so that it is possible to retrieve the data that is desired rather than some randomly selected data. FIG. 4 sets forth a process for formatting media 36 in a manner which eliminates the need for a track 0 sensing switch. The head 40 may be positioned anywhere on media 36 when the disk drive is first turned on. Since it is unknown where the heads 40 are upon energization of an unformatted disk drive, the location of the heads must be considered to be random. The process set out in FIG. 4 begins formatting wherever the head 40 happens to be located, and follows a sequence of formatting the track, including the steps of: writing an identifying datum in the identification field 82 of each sector on the track; attempting to index the heads 40 one track to the outside, which can be done if head movement is not prevented by a mechanical stop (not shown) which is provided to prevent movement of head 40 off of the media; reading the identification fields 82 to determine if the head did not move to a new track; and continuing the sequence of format, index the heads one track to the outside, and read, until the heads have failed to move, at which point the heads are as far to the outside as possible. Formatting is then started all over, moving from this now known position, from outside to inside formatting each track, and providing track, sector and band classification identification in each sector's identification field 82. A few outside tracks are designated as the outside guard band, the data tracks are designated sequentially beginning with data track 0 on the outermost data track, and a few inside tracks are designated as an inside guard band.

In an alternate embodiment, the above formatting procedure can be reversed, locating the stop on the inside first and then formatting from the inside to the outside. If that procedure is utilized, then the data track numbering begins with a number one less than the desired number of tracks, and sequentially decrements with the last data track formatted being number zero.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A method of formatting a magnetic medium of a computer subsystem for storing and receiving data for a host computer system, the method comprising the steps of:
   (a) formatting a plurality of sectors on a track at a position at which a recording head is positioned, recording an identifying datum in an identification field of each said sector within said track, with said datum uniquely identifying said track;
   (b) attempting to increment the head position one track spacing toward the outer extremity of the magnetic media, with said attempt to increment the head position failing to increment the head position if head movement toward the outer extremity of the magnetic media is prevented by a stop;
   (c) reading any of said identification fields present on the track proximate to the head, thereby detecting whether the prior step was successful in incrementing the head position;
   (d) if no identification fields are detected for the track, then repeating steps (a) through (c) until identification fields are detected in step (c), then;
   (e) formatting the track proximate to the recording head, recording an identification datum in the identification field, specifying an outside guard band track identification therein;
   (f) incrementing the head position by one track spacing in a direction away from the outer extremity of the media;
   (g) repeating steps (e) and (f) until a predetermined number of outside guard band tracks have been formatted;
   (h) formatting the track proximate to the head, recording an identification datum in the identification field specifying the track as data track 0;
   (i) incrementing the head position one track spacing in the direction away from the outer extremity of the recording media;
   (j) formatting the track proximate to the recording head, recording an identification datum in the identification field specifying the track as a data track with a number equal to the number assigned the immediate prior data track incremented by one;
   (k) repeating steps (i) and (j) until a predetermined number of data tracks have been formatted;
   (l) incrementing the head position by one track spacing in the direction away from the outer extremity of the media;
   (m) formatting the track proximate to the recording head, recording an identification datum in the identification field specifying an inside guard band track identification;
   (n) repeating steps (l) and (m) until a predetermined number of inside guard tracks have been formatted;
   (o) ending formatting procedure.

2. The method of claim 1 wherein the magnetic medium is a hard circular disk and the tracks are circular.

3. A method of formatting a magnetic medium of a computer subsystem for storing and receiving data for a host computer system, the method comprising the step of:
   (a) formatting a plurality of sectors on a track at a position at which a recording head is positioned, recording an identifying datum in an identification field of each said sector within said track, with said datum uniquely identifying said track;
   (b) attempting to increment the head position one track spacing in a direction away from the outer extremity of the magnetic media, with said attempt to increment the head position failing to increment the head position if head movement away from the outer extremity of the magnetic media is prevented by a stop;
   (c) reading any of said identification fields present on the track proximate to that head, thereby detecting whether the prior step was successful in incrementing the head position;
   (d) if no identification fields are detected for the track, then repeating steps (a) through (c) until identification fields are detected in step (c), then;
   (e) formatting the track proximate to the recording head, recording an identification datum in the identification field, specifying an inside guard band track identification therein;
   (f) incrementing the head position by one track spacing in a direction toward the outer extremity of the media;
   (g) repeating steps (e) and (f) until a predetermined number of inside guard band tracks have been formatted, then;
   (h) formatting the track proximate to the head, recording an identification datum in the identification field specifying the track as a data track with a track number equal to one less than the total number of data tracks desired;
   (i) incrementing the head position one track spacing in the direction toward the outer extremity of the recording media;
   (j) formatting the track proximate to the recording head, recording an identification datum in the identification field specifying the track as a data track with a number equal to the number assigned the immediate prior data track decremented by one;
   (k) repeating steps (k) and (j) until a predetermined number of data tracks have been formatted;
   (l) incrementing the head position by one track spacing in the direction toward the outer extremity of the media;
   (m) formatting the track proximate to the recording head, recording an identification datum in the identification field specifying an outside guard bank track identification;
   (n) repeating steps (l) and (m) until a predetermined number of outside guard tracks have been formatted;
   (o) ending formatting procedure.

* * * * *